United States Patent [19]

Matsuoka et al.

[11] Patent Number: 4,669,335
[45] Date of Patent: Jun. 2, 1987

[54] CONTROL OF A VEHICLE AUTOMATIC TRANSMISSION

[75] Inventors: Toshihiro Matsuoka, Hiroshima; Toshiyuki Kikuchi, Higashihiroshima, both of Japan

[73] Assignee: Mazda Motor Corporation, Hiroshima, Japan

[21] Appl. No.: 675,563

[22] Filed: Nov. 28, 1984

[30] Foreign Application Priority Data

Nov. 28, 1983 [JP] Japan .................. 58-225240

[51] Int. Cl.⁴ .......................... B60K 41/18
[52] U.S. Cl. .................. 74/866; 74/752 A
[58] Field of Search ......... 74/866, 752 A, 752 D, 74/865; 364/424.1

[56] References Cited

U.S. PATENT DOCUMENTS

| | | | |
|---|---|---|---|
| 4,208,929 | 6/1980 | Heino et al. | 74/866 X |
| 4,262,335 | 4/1981 | Ahlen et al. | 74/866 X |
| 4,361,060 | 11/1982 | Smyth | 74/866 |
| 4,380,080 | 4/1983 | Kishi et al. | 74/866 X |
| 4,411,174 | 10/1983 | Yokoi et al. | 74/866 |
| 4,425,620 | 1/1984 | Batcheller | 74/866 X |
| 4,463,427 | 7/1984 | Bonnetain et al. | 364/424.1 X |
| 4,523,281 | 6/1985 | Noda et al. | 364/424.1 |

FOREIGN PATENT DOCUMENTS

| | | |
|---|---|---|
| 52-182 | 1/1977 | Japan . |
| 55-129645 | 10/1980 | Japan . |
| 48403 | 3/1984 | Japan .................. 364/424.1 |
| 2102086 | 1/1983 | United Kingdom ........ 364/424.1 |

Primary Examiner—Allan D. Herrmann
Assistant Examiner—David Novais
Attorney, Agent, or Firm—Fleit, Jacobson, Cohn & Price

[57] ABSTRACT

A vehicle automatic transmission including a hydraulic torque converter and a multiple stage transmission gear mechanism connected with the torque converter, and an electronic control unit for automatically shifting the gear stages of the gear mechanism in accordance with the vehicle operating condition. The electronic control unit has a plurality of gear shift patterns for a plurality of operating modes, such as a normal mode, a power mode and an economy mode. A manual switch is provided for selecting one of the operating modes. The control unit controls the gear mechanism so that different gear ratios are obtained between corresponding gear stages in different operating modes.

5 Claims, 10 Drawing Figures

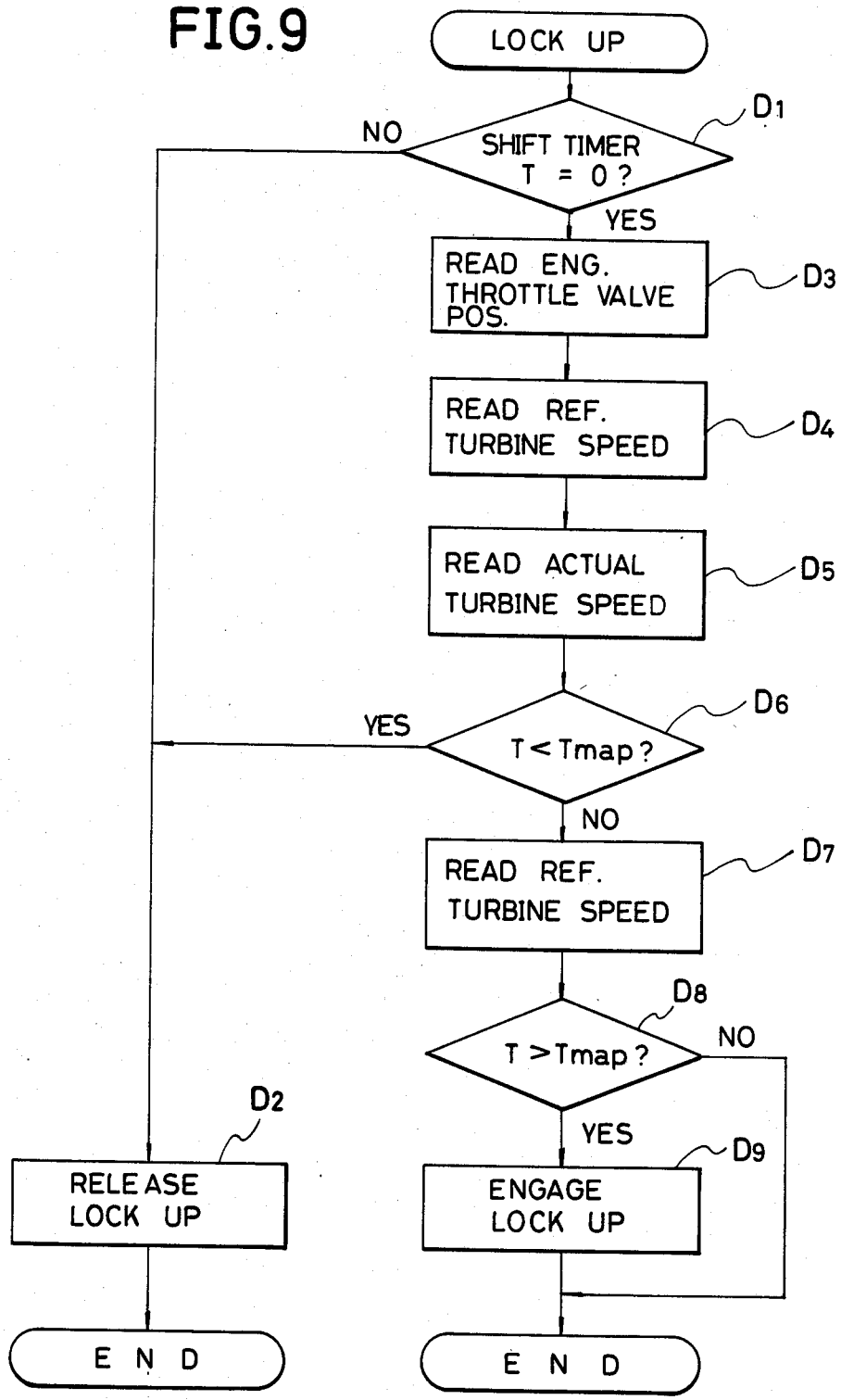

CONTROL OF A VEHICLE AUTOMATIC TRANSMISSION

BACKGROUND OF THE INVENTION

1. Field of the Invention

The present invention relates to control means for automatic transmissions and more particularly to control means for automatic transmissions having a hydraulic torque converter and a multiple-stage transmission gear mechanism connected with the hydraulic torque converter. More specifically, the present invention pertains to control means for determining the gear stage of the transmission gear mechanism in accordance with the vehicle operating condition.

2. Description of the Prior Art

Conventional automatic transmissions generally include a hydraulic torque converter having an output shaft connected with a multiple-stage gear transmission mechanism, such as a planetary gear mechanism. For selecting a desired one of the gear stages, the transmission usually includes a hydraulic system which has hydraulically operated and electromagnetically operated valves for appropriately selecting hydraulic circuits to thereby engage selected ones of friction devices such as clutches and brakes. Where the hydraulic system includes electromagnetically operated solenoid valves, electronic means is generally provided for detecting that the vehicle operating condition has been shifted from one zone to another, crossing a shifting line and producing electric signals for energizing appropriate ones of the solenoid valves.

Generally, such a shifting line is determined in terms of the vehicle speed and the engine load.

It has been known in automatic transmissions of the aforementioned type to provide more than one shift pattern, each having a plurality of shift lines. For example, Japanese patent publication No. 52-182 proposes an automatic transmission control which includes two shift patterns which can be manually selected for governing gear shifting operations, so that the gear mechanism is shifted at a lower vehicle speed under one of the shift patterns than under the other shift pattern. Since the shift pattern wherein the shifting is carried out at a lower vehicle speed can give economical operation, it may be called an economy mode, whereas the other shift pattern may be called a power mode, since it can give a stronger acceleration.

It has been proposed to select the shift pattern automatically in accordance with a vehicle condition. For example, in Japanese patent application No. 54-34643 filed on Mar. 24, 1979, and disclosed for public inspection on Oct. 7, 1980, under the disclosure No. 55-129645, there is disclosed a control system for automatic transmissions wherein the shift pattern is switched to the economy mode when the fuel quantity decreases below a predetermined level. It should, however, be noted that in the known control systems, accelerating characteristics cannot substantially be changed by selectively switching the shifting pattern from one to another. Particularly in the vehicle starting period, the transmission gear mechanism is in the first stage both in the power mode and the economy mode, so that there will be no difference in acceleration between the two modes.

OBJECT OF THE INVENTION

It is an object of the present invention to provide a vehicle automatic transmission provided with a control system having a plurality of gear shift patterns with which vehicle operating characteristics can be substantially varied.

Another object of the present invention is to provide a control system for a vehicle automatic transmission having a plurality of gear shift patterns which can provide different series of gear ratios in the transmission gear mechanism to produce different feelings in acceleration and deceleration.

A further object of the present invention is to provide a control system for a vehicle automatic transmission having power and economy modes which can provide significantly different operating characteristics.

SUMMARY OF THE INVENTION

According to the present invention, the above and other objects can be accomplished by an automatic transmission for motor vehicles which comprises a torque converter having an input member adapted to be connected with an engine and an output member, a transmission gear mechanism having a plurality of gear trains of different gear ratios, said transmission gear mechanism including an input member connected with the output member of the torque converter, hydraulic actuator means for selecting one of said gear trains in the transmission gear mechanism, electromagnetic means for controlling a supply of hydraulic fluid to said hydraulic actuator means, sensing means for detecting vehicle operating conditions and producing an operating condition signal, control means provided with mode selecting manual switch means for determining an operating mode and producing a mode signal depending on an actuated position of the switch means, said control means including gear train series selecting means responsive to said mode signal for selecting one of a plurality of series of the gear trains in accordance with the operating mode, a plurality of shift patterns for governing gear shifting operations depending on the vehicle operating condition, shift pattern selecting means responsive to said mode signal and selecting one of said shift patterns, shifting means for comparing the operating condition signal with the selected one of the shift patterns and producing a shift signal when it is judged that gear shifting is necessary, said shift signal being applied to said electromagnetic means to effect the gear shifting in accordance with the selected series of the gear trains.

Preferably, the plurality of series of the gear trains have first gear stages of different gear ratios. The transmission gear mechanism may include a first gear unit which can provide three gear trains and a second gear unit which is connected with the first gear unit and can provide two gear trains so that six different combinations of the gear trains can be obtained as a whole. The gear train series selecting means may select four of such combinations of the gear trains in accordance with the selected operating mode. The transmission gear mechanism may be of a planetary type which is conventionally used in vehicle automatic transmissions.

BRIEF DESCRIPTION OF THE DRAWINGS

FIG. 9 is a flow chart showing the torque converter lock-up operation; and,

DESCRIPTION OF THE PREFERRED EMBODIMENT

General Arrangement

Figure 1:
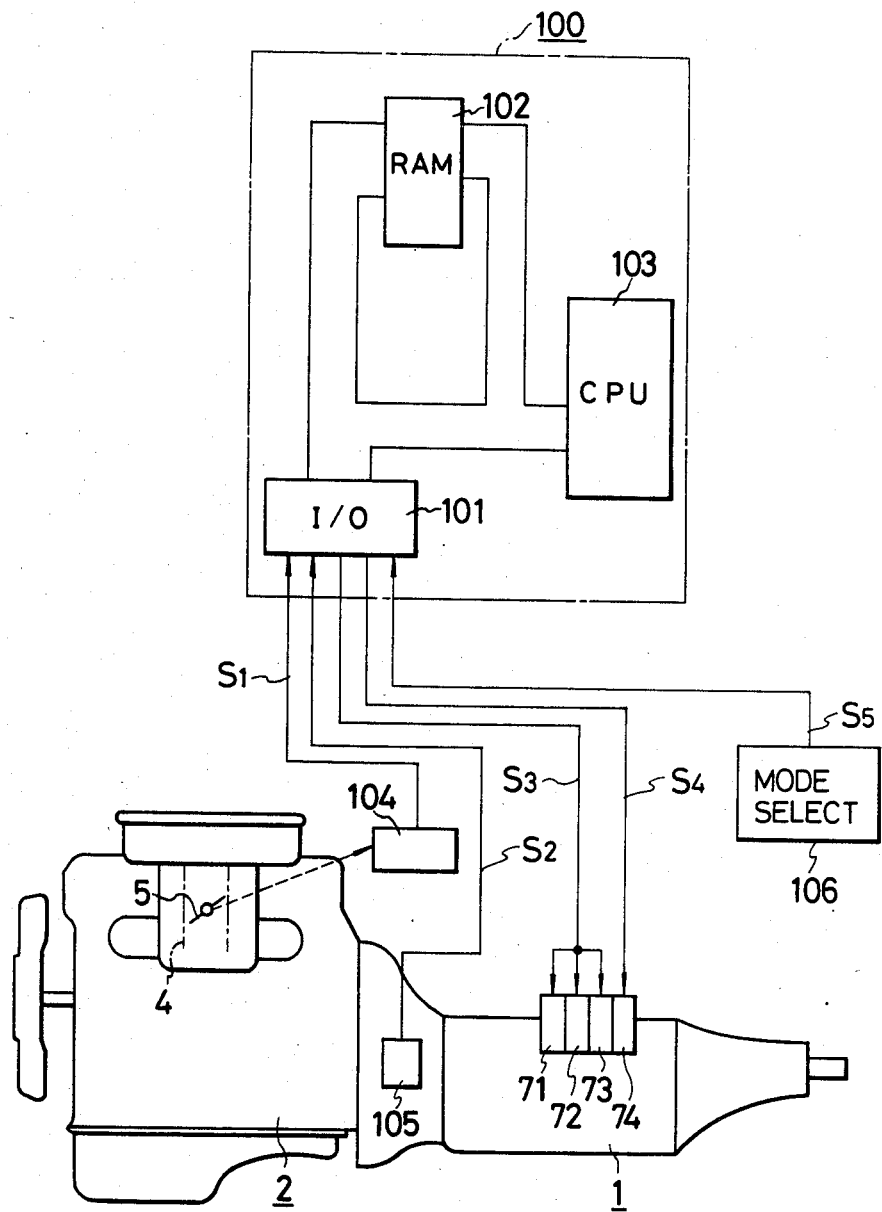
FIG. 1 is a schematic illustration of a vehicle automatic transmission having a control system in accordance with one embodiment of the present invention.

Referring to the drawings, particularly to FIG. 1, there is shown a vehicle automatic transmission 1 connected with an engine 2. In order to control the transmission 1, there is provided a control unit 100.

Basic Structure of the Transmission

Figure 2:
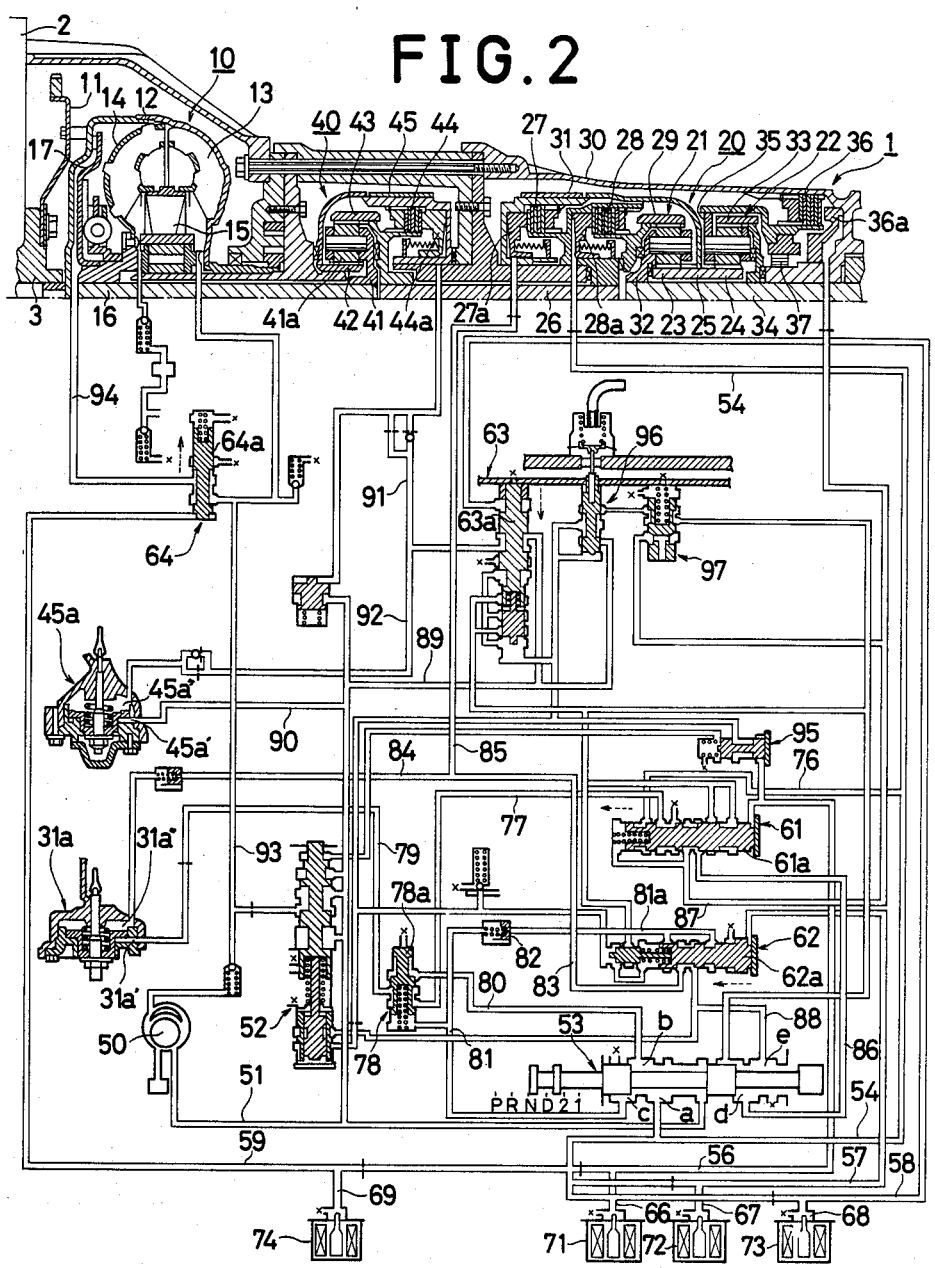
FIG. 2 is a sectional view of the transmission with a hydraulic control circuit.

Referring now to FIG. 2, there is shown an automatic transmission which comprises a hydraulic torque converter 10, a multiple stage transmission gear mechanism 20, and a planetary gear type over-drive transmission mechanism 40 arranged between the torque converter 10 and the multiple stage transmission gear mechanism 20.

The torque converter 10 has a pump 13 connected with an output shaft 3 of an engine 2 through a drive plate 11 and a converter casing 12, a turbine 14 provided in the casing 12 to face to the pump 13 and a stator 15 disposed between the pump 13 and the turbine 14. A converter output shaft 16 is connected with the turbine 14. A lock-up clutch 17 is provided between the converter output shaft 16 and the casing 12 which is connected to the pump 13. The lock-up clutch 17 is normally engaged with the casing 12 under a pressure of hydraulic fluid which circulates in the torque converter 10, and is released by a hydraulic pressure, which is drawn to a space between the casing 12 and the clutch 17 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 though a connecting rod 25. The gear mechanism 20 has an input shaft 26 connected through a front clutch 27 with the connecting rod 25 and through a rear clutch 28 with an internal gear 29 of the front planetary gear unit 21. A front brake 31 is provided between the connecting rod 25 of the sun gears 23, 24 of the gear units 21 and 22, and a casing 30 of the transmission. The gear mechanism 20 also has an output shaft 34 connected with a planetary carrier 32 of the front planetary gear unit 21 and an internal gear 33 of the rear planetary gear unit 22. The rear planetary gear unit 22 has a planetary carrier 35, and there are provided between the planetary carrier 35 and the transmission casing 30 a rear brake 36 and a one-way clutch 37.

The planetary gear type over-drive transmission mechanism 40 includes planetary gears 41a, a planetary carrier 41 rotatably carrying the planetary gears 41a and connected with the output shaft 16 of the torque converter 10, a sun gear 42 engaged with the planetary gears 41a, and an internal gear 43 which is also engaged with the planetary gears 41a and connected with the sun gear 42 through a direct connecting clutch 44. An overdrive brake 45 is provided between the sun gear 42 and the transmission casing 30. The internal gear 43 is connected with the input shaft 26 of the multiple stage transmission gear mechanism 20.

The multiple stage transmission gear mechanism 20 is of known type and can provide three forward driving gear stages and one reverse stage through selective engagements of the clutches and brakes. The relationships between the forward gear stages and the engagements of the clutches and brakes are shown in Table 1 together with typical values of gear ratios in the gear stages. The planetary gear type over-drive transmission mechanism 40 connects the shafts 16 and 26 directly when the direct connection clutch 44 is engaged and the brake 45 is released, and provides an over-drive connection between the shafts 16 and 26 when the brake 45 is engaged and the clutch 44 is released. This function is shown in Table 2 together with typical values of the gear ratios.

TABLE 1

| GEAR STAGE | FRONT CLUTCH 27 | REAR CLUTCH 28 | FRONT BRAKE 31 | REAR BRAKE 36 | GEAR RATIO |
|---|---|---|---|---|---|
| 1 | | o | | o | 2.841 |
| 2 | | o | o | | 1.541 |
| 3 | o | o | | | 1.000 |

TABLE 2

| GEAR STAGE | DIRECT CONNECT CLUTCH 44 | OVER-DRIVE BRAKE 45 | GEAR RATIO |
|---|---|---|---|
| DIRECT | o | | 1.000 |
| OVER-DRIVE | | o | 0.720 |

It will be understood that, by combining the three forward gear stages in the gear mechanism 20 and the two gear stages in the over-drive transmission gear mechanism 40, it becomes possible to obtain six gear stages of different overall gear ratios.

Hydraulic Control Circuit

The above-mentioned automatic transmission is provided with a hydraulic control circuit as shown in FIG. 2. The hydraulic control circuit has an oil pump 50 which is driven by the engine output shaft 3. Hydraulic oil is discharged under pressure from the pump 50 into a pressure line 51. The oil pressure is reduced by a pressure regulating valve 52 and applied to a select valve 53. The select valve 53 has a plunger which can be selectively positioned in one of the shift positions 1, 2, D, N, R and P. When the plunger is positioned in one of the shift positions 1, 2 and D, the pressure line 51 is communicated with ports a, b, c of the select valve 103. The port a is communicated with a hydraulic actuator 28a for the rear clutch 28 through a line 54. When the select valve 53 is positioned in the above mentioned position, the actuator 28a makes the rear clutch 28 engage. The port a is also communicated with the left-hand end portion of a 1-2 shift valve 61 having a spool which is now biased rightward in FIG. 2 under the oil pressure from the port a. The port a is further communicated with the right-hand end portion of the 1-2 shift valve 61 through a first line 56, the right-hand end portion of a 2-3 shift valve 62 through a second line 57, and the upper end portion of a 3-4 shift valve 63 through a third line 58. First, second and third drain lines 66, 67 and 68 are provided in the first, second and third lines 56, 57 and 58, respectively. These drain lines 66, 67 and 68 are respectively provided with a first, second and third solenoid valves 71, 72 and 73 for opening and closing them. When the port a is communicated with the line 51, the solenoid valves 71, 72 and 73 are energized to close the drain lines 66, 67, 68 and as a result, the pressure is built up in the first, second and third line 56, 57, 58.

The port b is communicated with a second lock valve 78 through a line 80. The oil pressure which is applied from the port b to the second lock valve 78 acts to bias the spool 78a of the valve 78 downwards. When the spool 78a of the valve 78 is in the lower position, the line 80 is communicated with the line 79 so that the oil pressure is introduced into a brake engaging pressure chamber 31a' of an actuator 31a to engage the front brake 31. The port c is communicated with the second lock valve 78 through a line 81. The oil pressure which is applied from the port c to the second lock valve 78 acts to bias the spool 78a of the valve 78 upward. The port c is also communicated with the 2-3 shift valve 62 through a pressure line 81a having an orifice check valve 82. The line 81a is communicated with a line 83 when the spool of the 2-3 shift valve 120 is moved leftward by the pressure in the second line 57, which increases upon energizing the solenoid valve 72 in the drain line 67. The line 83 is communicated with the releasing pressure chamber 31a" of the actuator 31a. When oil pressure is introduced into the releasing pressure chamber 31a", the actuator 31a is moved to release the brake 31 against the pressure in the engaging pressure chamber 31a'. Additionally, the pressure in the line 83 is introduced into the actuator 27a for the front clutch 27 to make the clutch 27 engage.

The select valve 53 has a port d which is communicated with the pressure line 51 when the valve 53 is positioned in the position 1. The port d is communicated with the 1-2 shift valve 61 through a line 86, and with an actuator 36a for the rear brake 36 through a further line 87. When the solenoid valves 71 and 72 are energized, the spools of the 1-2 shift valve 61 and the 2-3 shift valve 62 are moved to thereby change the port connections for engaging appropriate brakes and/or clutches to establish 1-2, 2-3 shifting operations, respectively. The hydraulic control circuit is also provided with a cut-back valve 95 for making the oil pressure from the pressure regulating valve 52 stable, a vacuum throttle valve 96 for varying the line pressure from the pressure regulating valve 52 according to the suction pressure in the engine intake passage, and a valve 97 for backing up the throttle valve 96.

Furthermore, this hydraulic control circuit is provided with an actuator 44a for controlling the clutch 44 and an actuator 45a for the brake 45 of the planetary gear type over-drive transmission mechanism 40. The actuator 45a has an engaging pressure chamber 45a' communicated with the pressure line 51 through a line 90. The brake 45 is operated when the actuator 45a is moved under the pressure in the line 51. The pressure line 51 is connected through a line 89 with the 3-4 shift valve 63. When the solenoid valve 73 is energized, the spool 63a of the 3-4 shift valve 63 is moved downward to communicate the pressure line 51 through the line 89 with a line 91 so that the oil pressure is introduced into the line 91. The oil pressure introduced into the line 91 acts on a releasing pressure chamber 45a" of the actuator 45a to release the brake 45, and on the actuator 44a to make the clutch 44 engage.

Still further, the present hydraulic control circuit is provided with a lock-up control valve 64, which is communicated with a port a of the select valve 53 through a line 59. From the line 59, a branch drain line 69 extends and is provided with a solenoid valve 74. When the pressure in the line 59 increases by closing the drain line 69 with the solenoid valve 74 being energized, the lock-up control valve 64 has its spool 64a moved upward to cut the communication between lines 93 and 94 and drain the pressure in the line 94 so that the lock-up clutch 17 is engaged.

In the above arrangement, the relations of the overall gear ratios and the operations of the solenoids, the brakes and the clutches are shown in Table 3.

TABLE 3

| SOLENOID 71 | SOLENOID 72 | SOLENOID 73 | FRONT CLUTCH 27 | REAR CLUTCH 28 | FRONT BRAKE 31 | DIRECT CONNECT CLUTCH 44 | OVER-DRIVE BRAKE 45 | GEAR RATIO |
|---|---|---|---|---|---|---|---|---|
| OFF | OFF | OFF |  | o |  | o |  | 2.841 |
| ON | OFF | OFF |  | o | o | o |  | 1.541 |
| OFF | ON | OFF | o | o |  | o |  | 1.000 |
| OFF | OFF | ON |  | o |  |  | o | 2.046 |
| ON | ON | OFF | o | o |  | o |  | 1.000 |
| ON | OFF | ON |  | o | o |  | o | 1.110 |
| OFF | ON | ON | o | o |  |  | o | 0.720 |
| ON | ON | ON | o | o |  |  | o | 0.720 |

It will be understood in the Table 3 that six different gear ratios can be obtained through selective energization of the three solenoids 71, 72 and 73. Thus, it is possible to selectively combine the gear ratios to provide a plurality of operating modes as, for example, shown in Table 4.

TABLE 4

| GEAR STAGE | POWER MODE | NORMAL MODE | ECONOMY MODE A | ECONOMY MODE B |
|---|---|---|---|---|
| 1 | 2.841 | 2.841 | 2.046 | 2.046 |
| 2 | 2.046 | 1.541 | 1.541 | 1.541 |
| 3 | 1.541 | 1.000 | 1.000 | 1.110 |
| 4 | 1.000 | 0.720 | 0.720 | 1.000 |
| 5 | 0.720 |  |  | 0.720 |

In Table 5, there is shown a relationship between the operation of the solenoid 74 and the torque converter lock-up.

TABLE 5

| SOL 74 | Lock-up |
| --- | --- |
| ON | engage |
| OFF | release |

Electronic Control Circuit

Referring to FIG. 1, there is shown an electronic control circuit 100 for controlling the above hydraulic control circuit. The electronic control circuit 100 can be constituted by a microcomputer which is provided with an input-output device (I/O) 101, a random access memory (RAM) 102 and a central processing unit (CPU) 103. For supplying signals to the I/O, there are provided an engine load sensor 104, and a torque converter turbine speed sensor 105. The engine load sensor 104 detects the load on the engine 2 in terms of the opening of an engine throttle valve 5 provided in the intake passage 4 of the engine 2 to produce an engine load signal $S_1$. The turbine speed sensor 105 senses the rotating speed of the converter output shaft 16 to produce a turbine speed signal $S_2$. There is also provided a manually operated mode select switch 106 which applies a mode signal $S_5$ to the I/O 101.

The I/O receives the engine load signal $S_1$, the turbine speed signal $S_2$ and the mode signal $S_5$, processes these signals, and applies them to the RAM 102. The RAM memorizes the signals $S_1$, $S_2$ and $S_5$ and applies these signals and other data pre-stored in the RAM 102 to the CPU 103 in accordance with demands of the CPU 103. As examples of the prestored data, there is a gear shift control map including a shift pattern comprised of a gear shift up control line X, a gear shift down control line Y, a torque converter lock up line Le and a torque converter lock up release line Le' as shown in FIG. 3.

Figure 3:
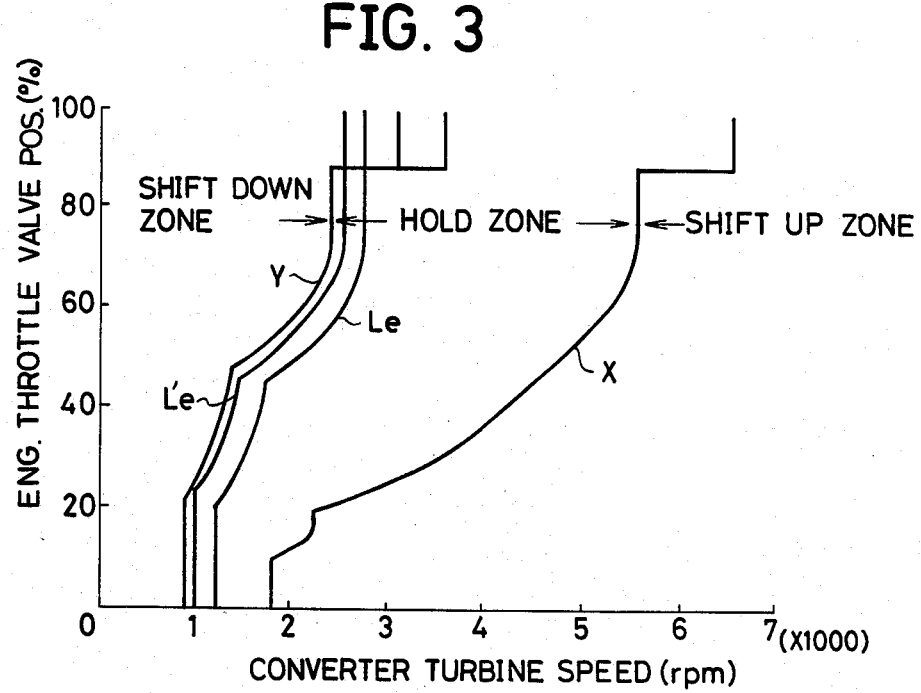
FIG. 3 is a diagram showing a shift control map.

It should be noted that the map shown in FIG. 3 is drawn in terms of the engine throttle valve position and the torque converter turbine speed, however, the map may be drawn in terms of the vehicle speed instead of the torque converter turbine speed.

The CPU 103 processes the input data and produces output signals $S_3$ and $S_4$ which are applied to the solenoids 71, 72, 73 and 74 to control the transmission. Although only one shift pattern is shown in FIG. 3, one or more shift patterns are further provided. For example, there may be provided a second shift pattern having shift-up and shift-down control lines and lock-up control lines which are shifted toward a low speed side as compared with corresponding lines shown in FIG. 3. There may further be provided a shift pattern having control lines shifted toward a high speed side. The CPU 103 selects one of such shift patterns in accordance with the mode signal $S_5$ from the switch 106. For example, when a normal mode is selected by the switch 106, the CPU 103 may select the shift pattern shown in FIG. 3. Under an economy mode, the CPU 103 may then select the shift pattern shifted toward the low speed side, whereas it may select the shift pattern shifted toward the high speed side under a power mode.

The operation of the control unit will now be described with reference to FIGS. 4 through 10.

General Operation

Figure 4:
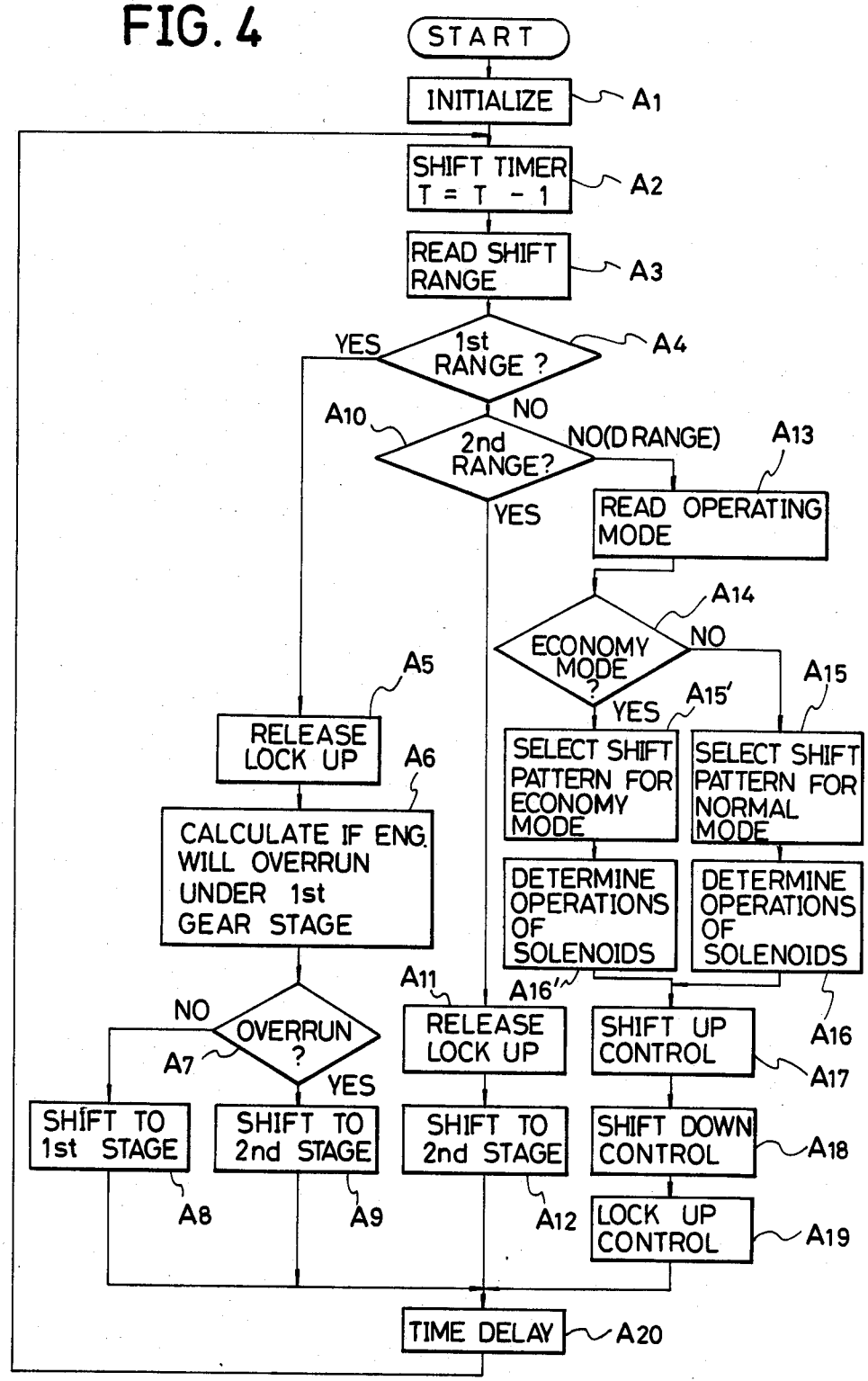
FIG. 4 is a program flow chart showing the general operation of the control unit.

FIG. 4 shows in general the operation of the control unit. When the program is initialized at the step $A_1$, the ports in the respective hydraulic control valves and the counters in the circuit are brought into intialized positions to thereby hold the gear mechanism at the first stage and release the torque converter lock-up clutch 17. Thereafter, the gear shift timer is set to T at the step $A_2$ and the shift range or the position of the select valve 53 is read in the Step $A_3$ and a judgement is carried out in the step $A_4$ as to whether the shift range is at the "1" range. If the judgement is YES, a signal is produced in the step $A_5$ to de-energize the solenoid 74 so as to release the lock-up clutch 17. Then, a calculation is made in the step $A_6$ to determine whether the engine will overrun if the gear mechanism is shifted down to the first stage. A judgement is then made in the step $A_7$ as to whether the engine will overrun based on the result of the calculation in the step $A_6$. If the judgement in the step $A_7$ is NO, a signal is produced to shift the gear mechanism to the first stage in the step $A_8$. If the judgement is NO, a signal is produced to shift the gear mechanism to the second stage in the step $A_9$. If the judgement in the step $A_4$ is NO, a further judgement is carried out in the step $A_{10}$ as to whether the shift range is at "2" range. If the judgement is YES, a signal is applied in the step $A_{11}$ to energize the solenoid valve 74 to release the lock-up clutch 17 and to fix the gear mechanism at the second stage. If the judgement in step $A_{10}$ is that the shift range is not at the second stage, it is interpreted that the shift valve 53 is in the "D" range.

Then, the operation mode is read in the step $A_{13}$ and a judgement is read in the step $A_{14}$ as to whether the mode is in the economy mode. If the result of the judgement is NO, it is interpreted that the normal mode is selected and the shift pattern for the normal mode as shown in FIG. 3 is selected in the step $A_{15}$. Thereafter, operations of the solenoids 71, 72, 73 and 74 are determined in the step $A_{16}$ for the normal mode in accordance with the Tables 3 and 4. For example, in the normal mode, all of the solenoids are de-energized for the first gear stage to obtain the gear ratio 2.841, but the solenoid 71 is energized for the second gear stage to obtain the gear ratio 1.541. For the third gear stage, the solenoid 72 is energized instead of the solenoid 71 to obtain the gear ratio 1.000 whereas the solenoids 72 and 73 are energized for the fourth gear stage to obtain the overdrive gear ratio. If the judgement in the step $A_{14}$ is YES, the shift pattern for the economy mode is selected in the step $A_{15}$ and the operations of the solenoids 71, 72, 73 and 74 are determined in the step $A_{16'}$ for the economy mode. Then, the shift up control, the shift down control and the torque converter lock up control are carried out respectively in the steps $A_{17}$, $A_{18}$ and $A_{19}$. Finally, a predetermined time delay, for example 50 m sec., is provided in the step $A_{20}$ and the step $A_2$ is repeated. In the step $A_2$, the value in the timer is substracted by one and a new value T is set.

Shift-up Control

Figure 6:
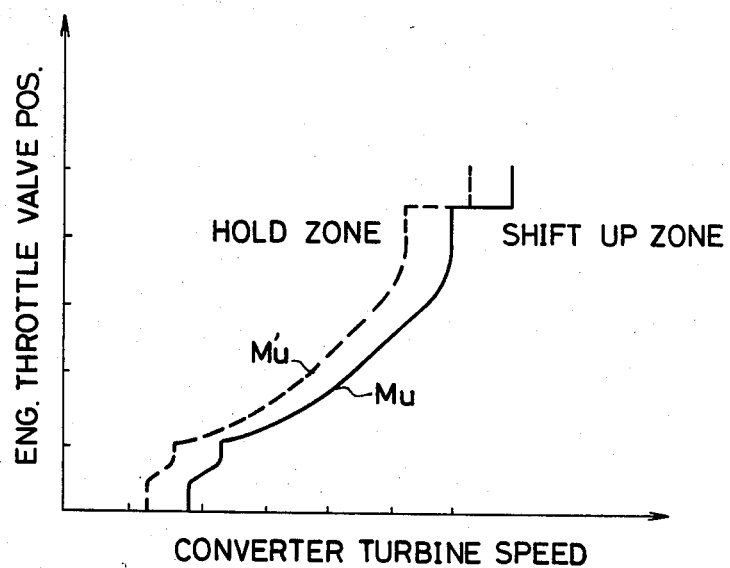
FIG. 6 is a diagram showing a gear shift-up pattern.
Figure 5:
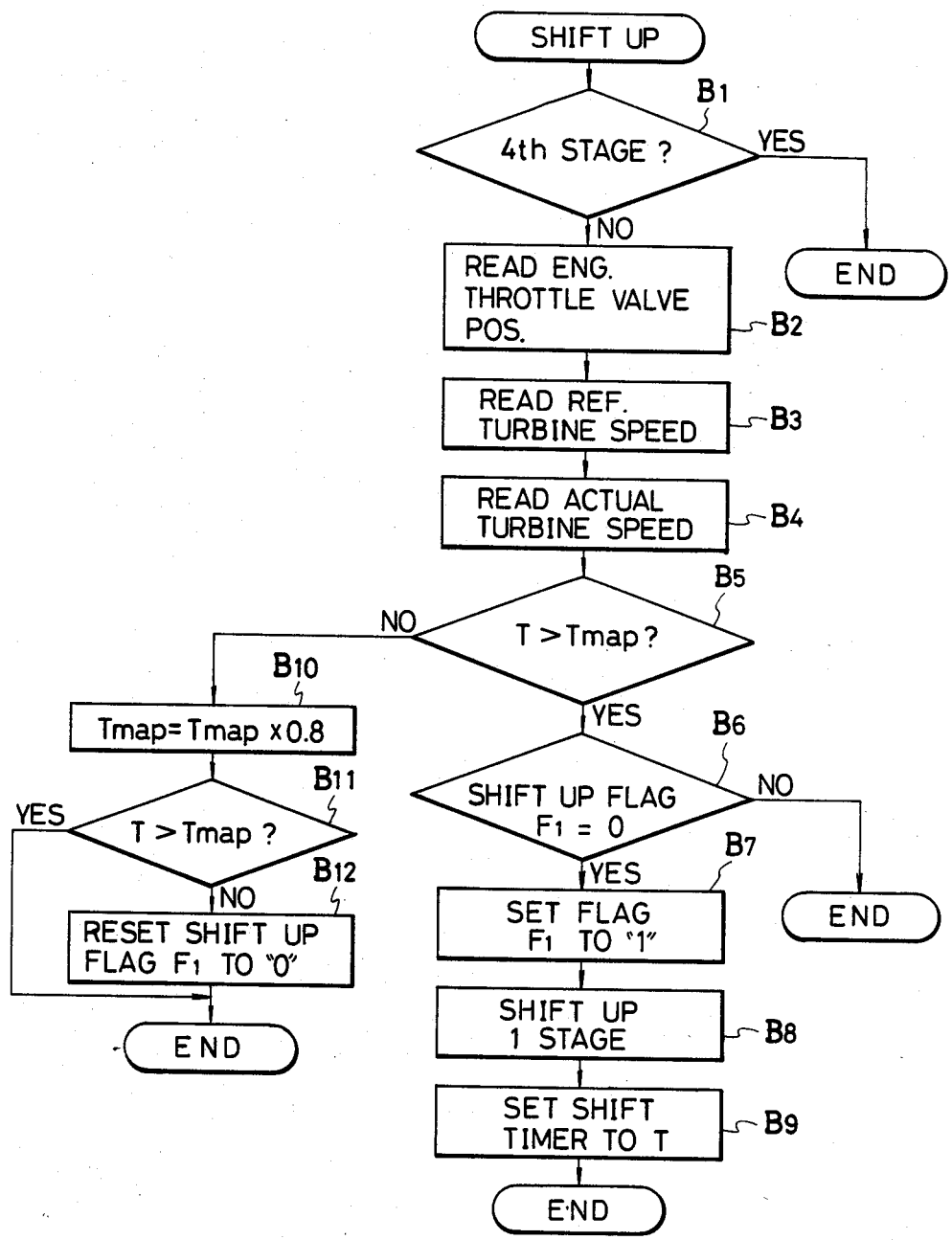
FIG. 5 is a flow chart showing the gear shift-up operation.

Referring to FIG. 5, the gear position of the transmission gear mechanism 20 is at first read and a judgement is made in the step B as to whether the gear mechanism 20 is at the fourth stage. If the judgement is YES, the shift-up control is terminated because no further shift-up is possible. If the fourth gear stage judgement in the step $B_1$ is NO, the engine throttle valve position is read in the step $B_2$ and a reference turbine speed, Tmap, is read in the step $B_3$ from the selected shift-up control line MU which is shown in FIG. 6. Thereafter, the actual turbine speed T is read in the step $B_4$ and a judgement is made in the step $B_5$ as to whether the actual turbine speed T is greater than the reference turbine speed Tmap. If the judgement is YES, a further judgement is made in the step $B_6$ as to whether the shift-up flag $F_1$ is set to zero. If the result of the judgement is NO, the procedure is terminated but, if the judgement is YES, the shift-up flag $F_1$ is set to one in the step $B_7$ and one stage shift up is carried out in the step $B_8$ by appropriately energizing the solenoids 71, 72 and 73, as determined in the step $A_{16}$, or $A_{16}'$ and the shift timer is set to the initial value T in the step $B_9$.

If the judgement in the step $B_5$ is NO, a new shift up control line Mu' is provided as shown in FIG. 6 by multiplying in the step $B_{10}$ the reference turbine speed, Tmap, with a constant 0.8 to obtain a new reference speed Tmap. Then, a judgement is made in the step $B_{11}$ as to whether the actual turbine speed is greater than the new reference speed Tmap. If the result of the judgement is YES, the procedure is terminated but, if the judgement is NO, the shift up flag $F_1$ is reset to zero in the step $B_{12}$. The steps $B_{10}$ through $B_{12}$ are performed in order to prevent the gear shifting operations to be repeatedly carried out when the turbine speed T is close to the reference turbine speed Tmap.

Shift Down Control

Figure 7:
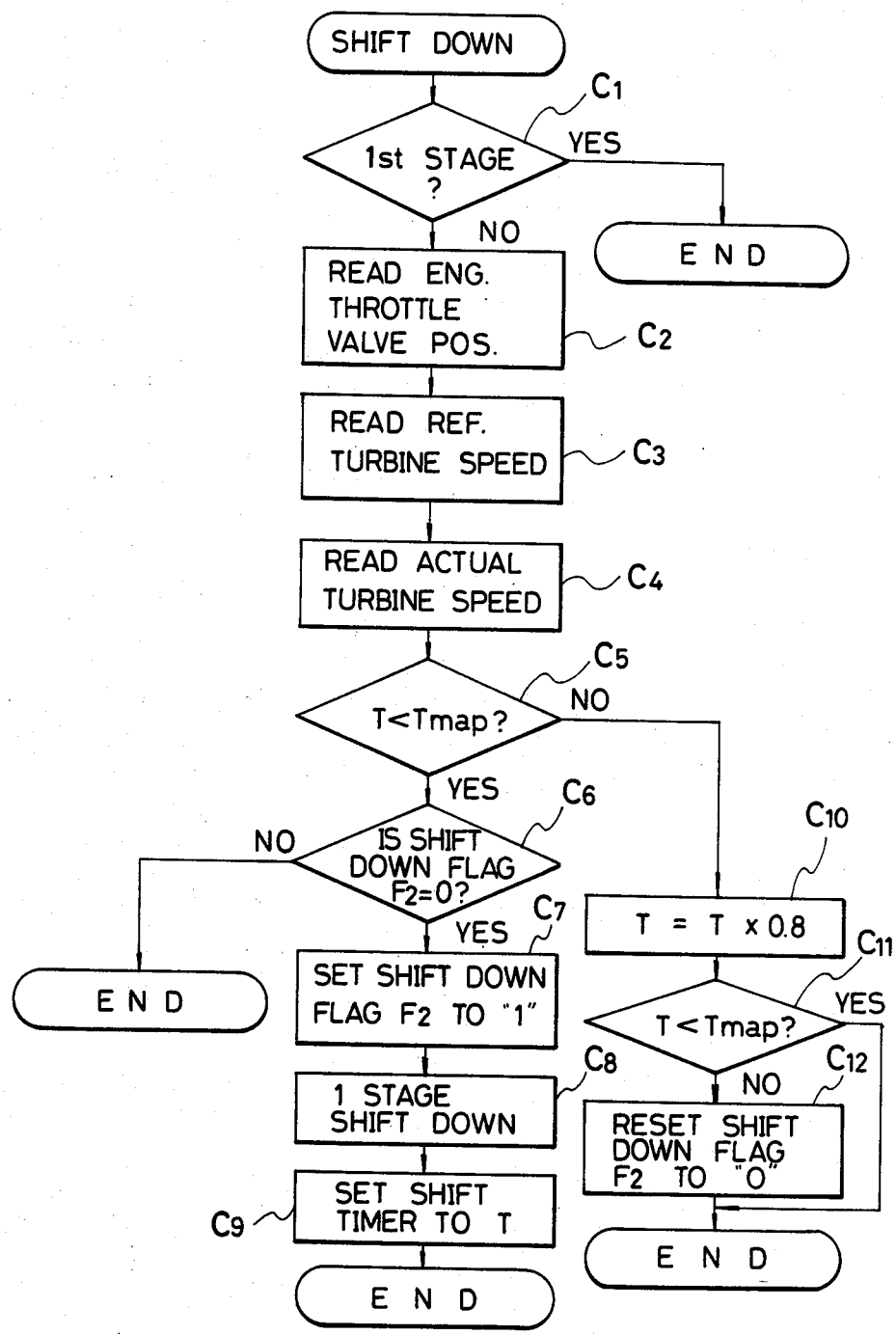
FIG. 7 is a flow chart showing the gear shift-down operation.

As shown in FIG. 7, in the gear shift down control, the gear position of the transmission gear mechanism 20 is at first read and judgement is made in the step $C_1$ as to whether the gear mechanism is at the first stage. If the judgement is YES, no further control can be carried out so that the control is finished.

Figure 8:
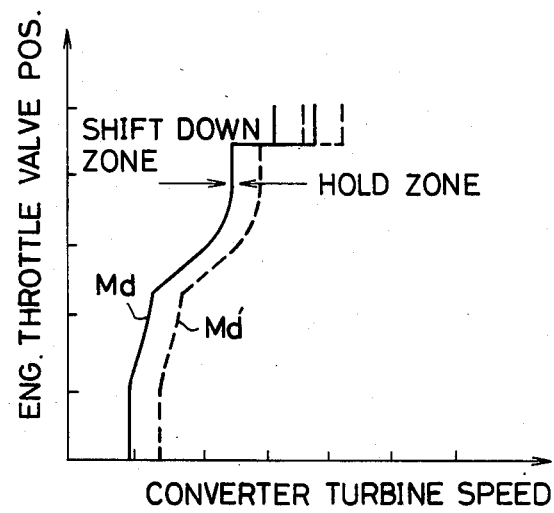
FIG. 8 is a diagram showing a gear shift-down pattern.

If the aforementioned judgement is NO, the engine throttle valve position is read in the step $C_2$ and a reference turbine speed, Tmap, is read in the step $C_3$ from the selected shift down control line Md, which is shown in FIG. 8. Thereafter, the actual turbine speed T is read in the step $C_4$. Then, a judgement is made in the step $C_5$ as to whether the actual turbine speed T is smaller than the reference turbine speed Tmap. If the result of the judgement is YES, a further judgement is made in the step $C_6$ as to whether the shift down flag $F_2$ in the zero position. If the result of the judgement is NO, the procedure is terminated, but if the result of the judgement is YES, the shift down flag $F_2$ is set to one in the step $C_7$ and a one-stage shift down is carried out in the step $C_8$. Thereafter, the shift timer is set to the initial value in the step $C_9$.

If the judgement in the step $C_5$ is NO, a new shift down control line Md' is provided as shown in FIG. 8. This is in effect carried out by multiplying in the step $C_{10}$ the turbine speed T with a constant 0.8 to obtain a new turbine speed T. Then, a judgement is made as to whether the new turbine speed T is smaller than the reference speed Tmap. If the result of the judgement is YES, the procedure is terminated, but if the result of the judgement is NO, the shift down flag $F_2$ is reset to zero in the step $C_{12}$.

Lock Up Control

Figure 10:
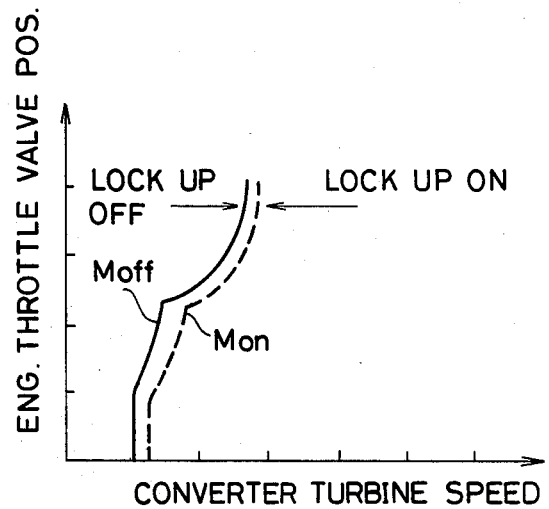
FIG. 10 is a diagram showing a torque converter lock-up map.

Referring to FIG. 9, a judgement is at first made in the step $D_1$ as to whether the count value in the shift timer T is zero. If the result of the judgement is NO, a signal is produced in the step $D_2$ to release the lock up clutch 17. If the result of the judgement is YES, the engine throttle valve position is read in the step $D_3$ and a reference turbine speed, Tmap, is read in the step $D_4$ from the lock up release line Moff as shown in FIG. 10. Then, the actual turbine speed T is read in the step $D_5$ and a judgement is made in the step $D_6$ as to whether the actual turbine speed T is smaller than the reference turbine speed Tmap. If the result of the judgement is YES, the step $D_2$ is carried out, but if the result of the judgement is NO, a further reference turbine speed Tmap is read in the step $D_7$ from the lock up engage line Mon. Thereafter, a judgement is made in the step $D_8$ as to whether the actual turbine speed T is greater than the reference turbine speed Tmap. If the result of the judgement is NO, the procedure is finished. If the judgement is YES, a signal is produced in the step $D_9$ to engage the lock up clutch 17.

The above descriptions have been made with respect to the operations wherein the normal and economy modes are alternatively selected. If should, however, be noted that other combinations of the modes may be chosen in Table 4. For example, the power mode and the economy mode A may be combined. In this instance, the gear ratios in any gear stage are different between the two modes, so that substantially different acceleration and deceleration feelings can be provided by the two modes. Further, three or more modes may be alternatively selected by the switch 106. It should therefore be understood that the invention is in no way limited to the details of the illustrated embodiment, but changes and modifications may be made without departing from the scope of the appended claims.

We claim:

1. Automatic transmission for motor vehicles which comprises a torque converter having an input member adapted to be connected with an engine and an output member, a transmission gear mechanism having a plurality of gear trains of different gear ratios, said transmission gear mechanism including an input member connected with the output member of the torque converter, hydraulic actuator means for selecting one of said gear trains in the transmission gear mechanism, electromagnetic means for controlling a supply of hydraulic fluid to said hydraulic actuator means, sensing means for detecting vehicle operating conditions and producing an operating condition signal, control means provided with mode selecting manual switch means for selecting one of a plurality of operating modes having the same number greater than three of gear stages provided by selecting the gear trains and producing a mode signal depending on an actuated position of the switch means, said control means including gear train series selecting means responsive to said mode signal for selecting one of a plurality of series of the gear trains in accordance with the operating mode, said plurality of series of the gear trains having at least first gear stages which are of different gear ratios, a plurality of shift patterns corresponding to said operating modes, respectively, for defining shift zones for each operating mode and governing gear shifting operations among said plurality of gear trains of said transmission gear mechanism depending on the vehicle operating condition, one of the shift patterns having shift zones which are on a high speed side with respect to corresponding shift zones in another shift pattern, said one shift pattern having a first gear stage which is of a higher gear ratio than a first gear stage of said other shift pattern, shift pattern selecting means responsive to said mode signal for selecting one of said shift patterns, shifting means for comparing the operating condition signal with the selected one of the shift patterns and producing a shift signal when it is judged that the operating condition is shifted from one shift zone to another and that gear shifting is necessary, said shift signal being applied to said electromagnetic means to effect gear shifting in accordance with the selected series of the gear trains.

2. An automatic transmission in accordance with claim 1 in which said transmission gear mechanism includes a first gear unit having three forward drive gear trains of gear ratios not smaller than one, first friction means operated by said hydraulic actuator means for selecting one of said three drive gear trains, a second gear unit having two forward drive gear trains of gear ratios not larger than one and connected with said first gear unit, second friction means operated by said hydraulic actuator means for selecting one of the two forward drive gear trains, said plurality of series of the gear trains being provided through selective operation of said first and second friction means so that first gear stages for the respective operating modes can be provided by actuating the first friction means to select the drive gear train of highest gear ratio in the first gear unit and by actuating the second friction means to select an appropriate one of the drive gear trains in the second gear unit in accordance with the mode signal.

3. An automatic transmission in accordance with claim 1 in which said mode selecting manual switch means includes means for selecting one of three operating modes including a normal mode, a power mode and an economy mode.

4. An automatic transmission in accordance with claim 1 in which one of the shift patterns has shift zones which are on a high speed side with respect to corresponding shift zones in the other shift pattern, said one shift pattern having a first gear stage which is of a higher gear ratio than a first gear stage of said other shift pattern.

5. An automatic transmission in accordance with claim 1 in which said operating modes have the same number of gear stages provided by selecting the gear trains.

* * * * *